(12) United States Patent
Bahnmueller et al.

(10) Patent No.: US 6,288,384 B1
(45) Date of Patent: Sep. 11, 2001

(54) METHOD AND SYSTEM FOR MEASURING THE DISTRIBUTION OF THE ENERGY FIELD DENSITY OF A LASER BEAM

(75) Inventors: Jochen Bahnmueller, Wendlingen; Markus Beck, Ulm; Axel Giering, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/317,404

(22) Filed: May 24, 1999

(30) Foreign Application Priority Data

May 22, 1998 (DE) .............................................. 198 22 924

(51) Int. Cl.⁷ ....................................................... G01J 5/08
(52) U.S. Cl. ......................................... 250/201.9; 250/347
(58) Field of Search ............................. 250/201.4, 201.9, 250/237 G, 347, 338.1, 348; 356/121; 372/32

(56) References Cited

U.S. PATENT DOCUMENTS

| 4,670,646 | 6/1987 | Spivey . |
| 4,745,280 | * 5/1988 | Gi et al. ................................ 250/347 |
| 4,807,992 | 2/1989 | Noguchi et al. . |

FOREIGN PATENT DOCUMENTS

| 35 10 937 | 10/1986 | (DE) . |
| 39 19 572 | 12/1990 | (DE) . |
| 0 140 661 | 5/1985 | (EP) . |
| 0 319 345 | 6/1989 | (EP) . |
| 10197336 | 7/1998 | (JP) . |
| WO 92/21010 | 11/1992 | (WO) . |

OTHER PUBLICATIONS

F & M 102 (1994) 10 entitled "X/Y–Scankopf fuer die Laserstrahlpositionierung" by M. Muth et al., pp. 521–524.

* cited by examiner

Primary Examiner—Stephone B. Allen
(74) Attorney, Agent, or Firm—Crowell & Moring LLP

(57) ABSTRACT

A method and system for measuring the distribution of the energy field density of a laser beam is provided. Laser pulses of the laser beam are extracted in groups or individually from the laser beam, are locally separated from one another, and the respective distribution of the energy field density of the deflected and locally separated individual laser pulses is measured.

30 Claims, 2 Drawing Sheets

METHOD AND SYSTEM FOR MEASURING THE DISTRIBUTION OF THE ENERGY FIELD DENSITY OF A LASER BEAM

BACKGROUND AND SUMMARY OF THE INVENTION

This application claims the priority of German Application No. 198 22 924.0, filed May 22, 1998, the disclosure of which is expressly incorporated by reference herein.

The invention relates to a method and system for measuring the distribution of the energy field density of a laser beam, as well as to a system for implementing the method as used in the laser technology field which is widely known.

To measure a laser beam requires the measurement of a large number of time-related and site-related beaming data. The measurability as well as the informational value of these data depends largely on the beam source which is used. With respect to the laser, a differentiation must be made between pulsed operation (p) and continuous-wave operation ($c_w$). Furthermore, in the case of pulsed operation, the pulse duration $t_p$ and the pulse period T or the pulse frequency $f_p=1/T$ must be considered to be largely independent values. In contrast to pulses, which are generated by acousto-optical modulators (Q-switch), in the case of lamp-pulsed systems, the above-mentioned values are mutually dependent to a high degree.

The distribution of the energy field density or intensity in the plane perpendicular to the propagation direction of the laser beam I (x, y) is an important measurable variable during the lasering of material. With respect to its lateral distribution, this measurable variable is responsible for the symmetry of the ablated workpiece volume (particularly important during the laser drilling and removal process). The energy flux density, which in a first approximation is responsible for the removed material volume, can be calculated as the product of the intensity and the pulse duration.

It should be noted that measuring such an intensity distribution should best take place in focus or close to focus ($I^{focus}$ (x, y)) There are two important reasons for this: (1) possible additional disturbance variables (lens, deviation mirror, thermal refractive effects, phase front deformations . . . ) are included in the measurement; and (2) this selection of the measuring site also makes it possible to directly measure geometrical beaming data (focus diameter $d_f$, beaming quality, beam position, . . . )

Currently, measuring instruments are available on the market for only a few measuring tasks ($CO_2$-laser, cw-operation) Particularly in the case of fast and short-pulsed lasers, virtually no adequate measuring instrument is available. Mainly within the wavelength range of 1,064 nm and 532 nm (Nd:YAG), CCD-cameras are used as site-resolving sensors. For measurements in focus or close to focus, systems are used which are based on the principle of a rotating needle or rapidly moving screens. However, the above-described measurable variables can be sensed by means of such systems only in a few exceptions. In particular, the transversal intensity distribution of Nd:YAG lasers in focus or close to focus: $I_{focus}(x, y)$, cannot be measured by the offered instruments.

The only systems which can manage the high power densities of the lasering focus (rotating needle or similar devices) have, among other things, an insufficient site resolution for the wavelength of the Nd:YAG laser. In addition, this method is basically unsuitable for pulsed lasers because the measurement of an intensity profile is composed of many partial measurements of different pulses.

For measuring laser pulse groups (hereinafter a laser pulse group is defined as a number of several directly successive laser pulses) and individual laser pulses, CCD cameras or similar site-resolving sensors are particularly suitable. This is because these can record an intensity distribution in a measuring operation. However, these systems, which are based on CCD-sensors, so far have no suitable triggering possibility for recording individual laser pulses. In addition, with the exception of very costly high-speed cameras, they are unable to record successive laser pulses. CCD cameras, as they are partly used in beam diagnostic modules, operate at 25–60 Hz. Based on normal frequencies of laser pulses (percussion drilling 10 Hz–10 kHz), an integration takes place in the extreme case by way of a laser pulse group of approximately 150 to 300 individual laser pulses. In addition, none of the CCD diagnostic systems can be used in focus or at least behind the lasering lens system.

It is an object of the present invention to develop a method and system by which the above-mentioned disadvantages are, at a minimum, reduced.

This and other objects are achieved by a method for measuring the distribution of the energy field density of a preferably pulsed laser beam, characterized in that a measuring beam which is correlated with the laser beam particularly in a constant manner is extracted from the laser beam. The measuring beam is imaged at different points in time in a defined and locally mutually separated manner. The distribution of the energy field density of the time-resolved partial beams of the measuring beam, which are imaged in a locally defined manner, is measured. A system to implement the method has a laser source and a detector which at least partially detects the distribution of the energy field density of the laser beam. The system has an extraction device (beam splitter) for the at least partial intensity-side extracting of a measuring beam preferably constantly correlated with the laser beam, from the laser beam. The extraction device is arranged within the beam path of the laser beam. The system has a deviating device which is arranged in the beam path of the measuring beam. The deviating device has at least one manipulator which, as a function of the time, deflects the measuring beam into defined directions in space and divides it into various partial beams, for example, a mirror which is controlled by means of a rotary step motor. The detector is arranged in the area of partial beams of the measuring beam which are deflected by the deviating device.

In addition to achieving the above object, the present invention also has the following advantages:

(1) It characterizes the laser beam sources as well as time-related beaming characteristics;

(2) By means of the improved time-resolved measurement of a pulsed laser beam, informationally valuable data can be obtained for the process simulation (laser drilling/laser removal);

(3) A process monitoring (on-line) is possible for quality control during manufacturing operations with pulsed beam sources, particularly in the case of laser ablation, laser drilling and/or laser welding processes; and (4) Systematic and/or statistical machining defects can be diagnosed and analyzed more precisely because, by using an informative beam diagnosis, it can clearly be decided whether the defects originate from fluctuations/defects of the material or from fluctuations asymmetries of the beaming source.

With respect to all fields of laser machining, it is generally applicable that the method according to the invention and the system according to the invention can be used in a simple manner, preferably in manufacturing and production. In particular, the beam diagnostic possibilities according to the invention are easy to operate and can easily be adapted. It is also a special advantage that, during a measurement in or behind the machining focus, no intervention is required in the beam guiding of the machining equipment.

Other objects, advantages and novel features of the present invention will become apparent from the following detailed description of the invention when considered in conjunction with the accompanying drawings.

DETAILED DESCRIPTION OF THE DRAWINGS

Figure 1:
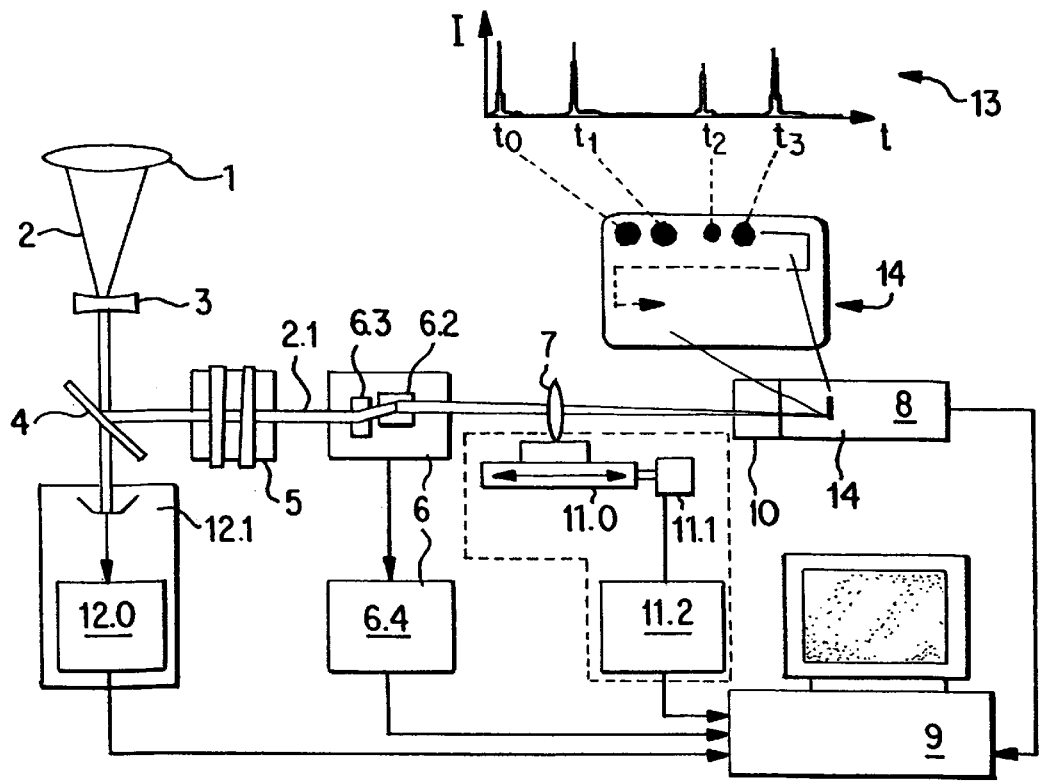
FIG. 1 a schematic block diagram of the construction of equipment for measuring the laser intensity in the machining beam path of the laser beam according to the invention.

FIG. 1 illustrates a concrete construction for measuring the distribution of the energy field density of a laser beam while using a system according to the invention which will be described in detail in the following. The illustrated system covers all above-mentioned functions. The elements of the standard equipment of the construction are listed in Table 1; optional expansion possibilities are indicated in Table 2.

TABLE 1

Components of Standard Equipment of the System

| Tab. 1 | Components/Function | Option |
|---|---|---|
| 1 | Machining lens system of laser system in the case of focus diagnosis | Imaging lens system replaces machining lens system in the case of crude beam observation |
| 2 | Machining and imaging focus | |
| 3 | Widening/focussing lens for beam collimation | |
| 4 | Beam splitter for attenuation. Possibly additional beam splitters. | In transmission, a power measuring device (12) can be operated for calibrating the system. |
| 5 | Variable attenuator | Attenuation factor 0–10$^{-5}$, by means of neutral wedge filters, filter wheels or similar devices. |
| 6 | x/y scanner + control unit | Alternative: Polygonal mirror or similar device. For a further attentuation of the beam, the scanner mirrors can also be provided with an AR coating. |
| 7 | Imaging lens | |
| 8 | CCD camera or measuring sensor (site-resolving) | |
| 9 | PC + interface modules to periphery | For a standard product, central control and handling unit and video screen also sufficient. |

TABLE 2

Components of Expansion Possibilities of the System

| Tab. 2 | Components/Function | Option |
|---|---|---|
| 10 | Shutter for recording pulses of long pulse duration (triggering by photodiode at 12.1) or c$_w$-lasers. | Chopper controlled |
| 11 | Z-positioning for adaptation of the spot size with respect to scanning rate. | When the scanner is inoperative or removed, the beaming quality can be measured according to DIN by displacing the lens. |
| 12 | Power measuring device + measuring head for calibration can be read out directly by PC for beam position and beam quality measurement. | |

Additional optional components are, for example, elements which attenuates the laser beam. With respect to their type and their function, these components are dependent on the power of the laser to be measured. The special selection and sequence of the components should be adapted to the respective application case (type of laser, power of laser, wavelength, etc.).

The actual system for measuring the distribution of the energy field density of the laser beam comprises a variable attenuator 5, a deviating device 6, an imaging lens 7, a detector 8 with a site-resolving measuring sensor 14 and an apertured diaphragm 10 which can be opened and closed in a controlled manner for a lock-in process for reducing and suppressing noise. The two optical elements 6.2 and 6.3 form a so-called x,y-scanner for the defined deflection of the laser beam in the x- and in the y-direction. Together with the control unit 6.4, they form the deviating device 6.

The laser beam coming from the laser, which is not shown, in the case of the focus diagnosis illustrated in FIG. 1, is imaged by the lens 1 of a machining lens system of the laser system by way of a machining or imaging focus 2 onto a collimation lens 3 for the beam collimation. The collimation lens 3 may be a widening or focusing lens or a corresponding lens system.

In the beam path of the laser beam, one or more beam splitters 4 are arranged behind the collimation lens 3. The beam splitter 4 splits the original laser beam into a measuring beam 2.1 and a continuous beam.

The beam splitter 4 can attenuate the continuous laser beam, in addition to the intensity of the laser light split-off by the beam splitter 4. This is particularly useful if the continuous laser beam is guided to a power measuring device 12.1 with the measuring head 12. Here, the measuring device 12.1 can be read out directly by a PC 9 in the case of a beam position and beam quality measurement for calibration.

The split-off laser beam, thus the measuring beam 2.1 which is correlated in a preferably fixed relationship with the laser beam provided, for example, for laser machining, passes through the variable attenuator 5. The attenuator is used particularly for protecting the photodiode arrays of the future CCD camera used as the detector 8. The attenuation factor of the variable attenuator 5, which is preferably carried out by using neutral wedge filters, filter wheels or similar devices, can be varied here between 0 and 10$^{-5}$.

In the beam path of the measuring beam 2.1, the attenuator 5 is followed by a deviating device 6, by which conditions which differ with respect to time, thus particularly individual pulses or pulse groups and the time sequence of the measuring beam can be imaged in a defined manner at spatially different sites.

For this purpose, the deviating device preferably has a so-called x/y scanner, which is known particularly from the laser inscription technique and which has two mirrors 6.2. and 6.3. as well as a pertaining control unit with a step motor 6.4. Instead of the mirrors 6.2 and 6.3, so-called polygonal mirrors or similar devices can also be used. Furthermore, the scanner mirrors for the further attentuation of the measuring beam 2.1. can also be provided with an AR coating (anti-reflection coating).

For imaging the pulses or pulse groups of the previous measuring beam 2.1., which were time-resolved in a defined local manner, onto a site-resolving measuring sensor 14, such as a photodiode array of a CCD camera used as the detector 8, another imaging lens 7 is arranged between the measuring sensor 14 and the deviating device 6. By means of the imaging lens 7, the spot size of a pulse or of a pulse group of the measuring beam 2.1 can be adapted to the scanning rate.

In particular, by displacing the imaging lens 7 approximately in parallel to the propagation direction of the pulses or of the pulse groups, the beaming quality can be measured according to DIN. However, for this purpose, the deviating device 6 must not be active so that the measuring beam 2.1. is not deflected in a locally defined manner and therefore time-resolved.

The displacement of the imaging lens 7 takes place via a carriage 11 which can be driven by a linear step motor 11.1. Control of the motor is by an electronic system 11.2.

The system also has a so-called "chopper" (a movable, particularly rotating apertured diaphragm 10) which is arranged in front of the beam entrance of the measuring beam 2.1. processed by the deviating device 6 into the CCD camera used as the detector 8. By means of the chopper, very long laser pulses (>ms), for example, from cw-lasers, can be chopped into individual pulses for measuring.

Finally, the system also has a computer 9 with pertaining interface cards to the corresponding control units and to the laser (FIG. 2, line 17), by which the whole process can be documented and, when corresponding software can be automated.

Figure 3:
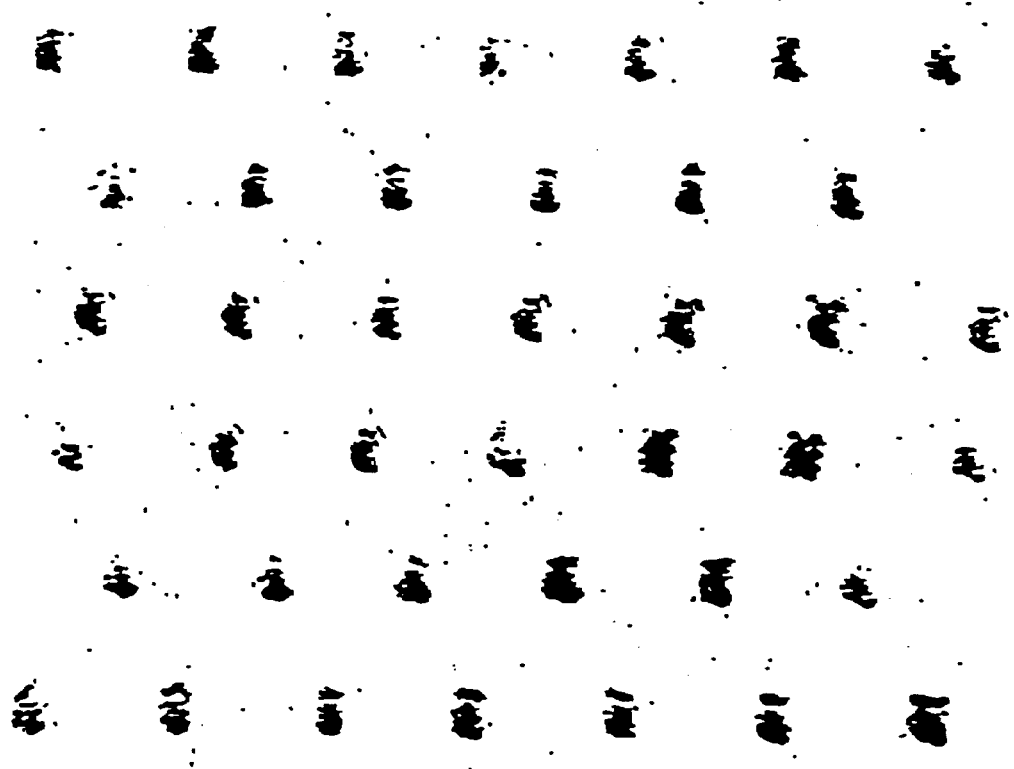
FIG. 3 illustrates a measuring result of a time-resolved and space-resolved beaming of a laser.

In practicing the method of the invention, the machining focus of the laser beam is preferably imaged on a CCD chip. By using an x/y scanner in the deviating device 6, the time sequence of the laser and/or heat radiation, which can be used as the measuring beam 2.1, or of the corresponding pulse groups of the measuring beam 2.1. is locally resolved; that is, in particular individual pulses are imaged on the CCD chip side-by-side. By means of this method, measuring frequencies can, for example, be reached which are even higher than 10 kHz. As illustrated in the expanded view of FIG. 3, at 200 pulses per video image, this value corresponds to a single-pulse field of approximately 70×70 pixels, in which case a detector surface with 1,000×1,000 pixels was used. The course of the recorded distribution of the energy field density can then be determined from this image in a simple manner by integration. It can also be displayed in an energy field density—time diagram 13 and can optionally be correspondingly analyzed, as described below by way of Examples 1 and 2.

As the result of the free programmability of the scanner, all frequencies from 0 to 10 kHz can be selected almost continuously with the corresponding resolution (full image up to 200 pulses per frame).

In the following, several advantageous characteristics of the invention are summarized as examples:

(1) Measuring of pulse chains to ($f_p$>10 kHz) in focus or in the crude beam;
(2) The conventional x/y scanner can be freely programmed with respect to its movement;
(3) The imaging and frequency scale is freely selectable;
(4) A modular construction is possible:
　(a) Alternative use in crude beam or focal area;
　(b) fast, advantageous retooling is possible;
　(c) shutter/chopper optional for long pulse durations or in the cw-operation;
(5) By means of an additional movable lens 7, the beam position and caustic surface can be measured according to DIN EN ISO 11146; and
(6) The development expenditures are low because only standard components are used.

The diagnostic concept is suitable for measuring and monitoring tasks on material machining lasers, particularly when the invention is used for pulsed Nd;YAG systems for drilling and ablating workpieces.

Virtually all pulsed laser systems can be monitored and measured by means of this principle so long as locally high-resolving detectors are available for the wavelength ranges.

However, the system is particularly suitable for lasers which work in the cw-operation. In this case also, sampling rates of 10 kHz can be achieved for the first time when measuring intensity distributions.

Furthermore, this method can also be used for observing reflexes from the machining zone. By means of a corresponding imaging lens system, the same construction can also be used for a 10 kHz process diagnosis.

Figure 2:
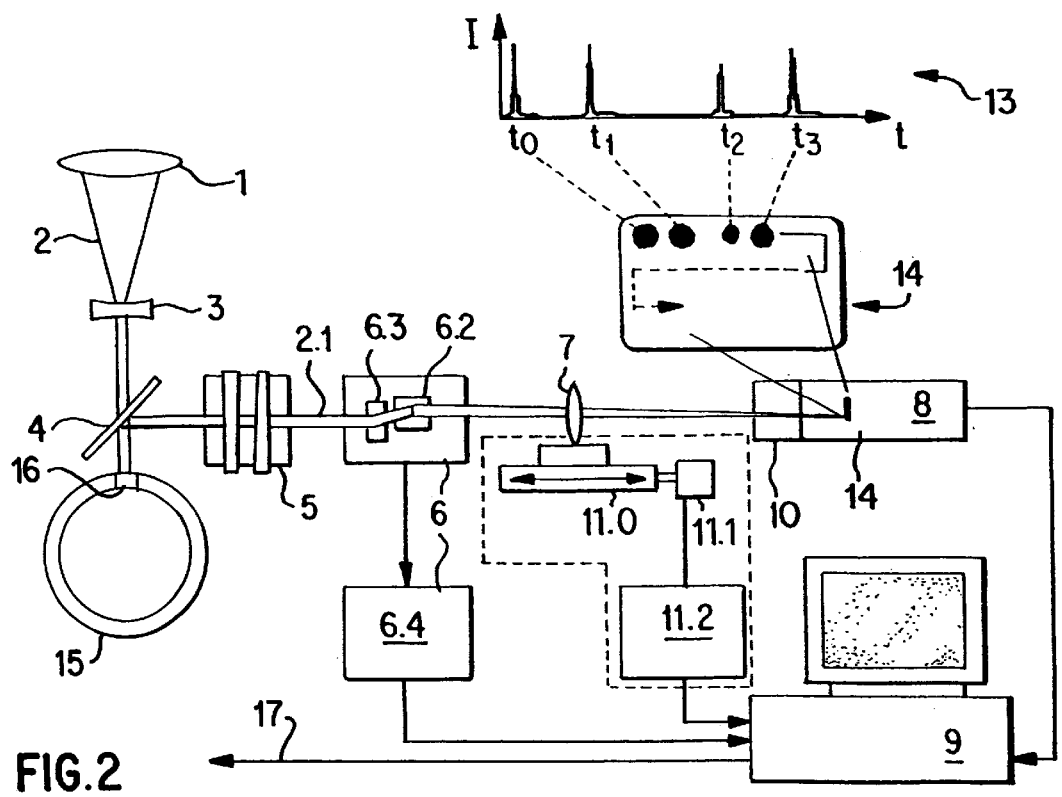
FIG. 2 is a schematic block diagram of the construction of equipment for measuring the laser intensity in a beam path coming from the tool according to the invention.

FIG. 2 shows another construction for measuring the intensity of a laser beam according to the invention. The system according to FIG. 2 also covers all functions mentioned above. Since the construction of the equipment according to FIG. 2 is largely identical to the construction according to FIG. 1, only their differences will be discussed here.

In contrast to the construction of FIG. 1, the mirror used as a beam splitter 4 is rotated 180°. As a result, no portion of the laser beam coming from the laser is extracted as a measuring beam 2.1. On the contrary, radiation is now used as the measuring beam 2.1. which comes from the workpiece and is the result of the machining laser beam. In particular, this is the laser beam reflected by the workpiece 15 and/or heat radiation coming from the momentary machining point of the workpiece 15.

The further processing of a measuring beam 2.1. corresponds to that described by means of FIG. 1. Since the measuring beam 2.1. may be heat radiation and/or a laser beam, differences may occur concerning the individually used components. For the same reason, it is conceivable that two measuring beams and therefore also two measuring paths are used, in which case one measuring path is then used for the heat radiation and the other is used for the laser radiation.

In the following, two different embodiments of the invention are described. Both embodiments, which are implemented by a construction of equipment corresponding to FIGS. 1 and 2, relate to the documentation and/or the monitoring of a working process in which a laser beam is used particularly for ablating, drilling or welding.

EXAMPLE 1 (FIG. 1)

By means of Example 1 described in the following, a documentation process is described, as can be used particularly during laser drilling and during laser welding. However, in contrast to FIG. 1, no power measuring device 12.0 with a measuring head 12.1, as illustrated, is situated in the impact area or at the machining site of the non-deviated laser beam, but, as illustrated in FIG. 2, the workpiece 15 to be machined is located there.

During laser drilling, it is advantageous with respect to the corresponding documentation to know which energy and therefore which drill-hole-related total energy is required for each drill hole 16. During laser welding, it is expedient for the laser weld seam to be step-controlled and a corresponding progressive, thus weld-seam-length-related total energy of the laser beam is required.

For a preferably used pulsed laser beam, the total energy is formed by the sum of the individual energies of the respective laser pulses. In this case, it should be taken into account that a portion of the energy entered by the laser may, under certain circumstances, flow off into the material of the workpiece to be machined.

In Example 1 according to FIG. 1, a defined portion of the laser beam is extracted as the measuring beam 2.1 from the focused and collimated laser beam 2 by means of the beam splitter 4. In this case, it is expedient that the extraction remains the same at all times, whereby a constant and simple correlation exists between the measuring beam 2.1. and the continuous laser beam. As the result of the extraction ratio between the measuring beam 2.1. and the laser beam (and possibly subsequent attenuations of the intensity of the measuring beam 2.1.), the intensity of the continuous laser beam—therefore of the laser beam which was not extracted and is used for the machining—can be determined in a simple manner.

The measuring beam 2.1. is processed in the above-described manner and the distributions of the energy field densities on the detector 8 are measured and are documented particularly by means of a computer 9 or the diagram 13.

By analyzing the time-resolved individual pulses or pulse groups of the measuring beam 2.1, it may now be determined that the sum of the individual intensities of the corresponding laser pulses—thus the total energy required for the machining point —was too low or too high (for example, drilling-through) for faultless machining operation. In this case, the produced workpiece will be defective. A simple and efficient possibility is therefore implemented for monitoring the quality of a machined workpiece.

If, in addition to the distribution of the energy field density, the pertaining machining site is also recorded and documented, it can then also be quantitatively determined where a corresponding aftertreatment of the workpiece is required and perhaps possible. By means of this more extensive measure, the faulty site on the workpiece 15 can therefore be determined, whereby a method is provided for determining the location of possible subsequent machining. This reduces the costs of the aftertreatment because now a search for the faulty point does not have to take place over the whole workpiece 15.

EXAMPLE 2 (FIG. 2)

By means of Example 2 described in the following, another documentation possibility is described, as it can also be used particularly during laser drilling and laser welding.

In Example 2 according to FIG. 2, a defined portion of the radiation which comes from the workpiece 15 and is the result of the influence of the machining laser beam, is extracted as the measuring beam 2.1. by the beam splitter 4 or optionally by a semi-reflecting mirror.

The measuring beam 2.1. is processed in the above-described manner and the distributions of the energy field densities on the detector 8 are measured and documented. Since the measuring beam 2.1. is radiation coming from the workpiece 15, particularly the backscattered laser beam and/or heat radiation, by means of the analysis of the time-resolved individual pulses or pulse groups of the measuring beam 2.1., a conclusion can be drawn with respect to the machining result.

Such an evaluation will be described in the following by means of a drilling operation 16 carried out by a laser beam. As long as the drill hole 16 has not yet been completely made, the time-resolved measuring beam 2.1. exhibits at most a slight change between two successive individual distributions of the energy field densities. This change is situated above a definable threshold value. This applies, irrespective of whether the measuring beam 2.1. is now laser radiation or heat radiation.

When the drill hole 16 is now completed, the corresponding energy field density of the measuring beam 2.1. falls below the threshold value because the laser beam is no longer backscattered or is only slightly backscattered and the heating at the machining site by means of the laser beam is reduced.

If, in the case of a given number of laser pulses per drill hole 16, a quantitative analysis is now carried out, a conclusion can be drawn with respect to the machining quality by means of the distribution of the energy field density. Since, in the case of a completed drill hole 16, the distribution of the energy field density of the measuring beam 2.1. pertaining to a laser pulse now falls under the threshold value, three possible cases exist:

a) The distribution of the energy field density of the defined last laser pulse falls below the threshold value. In this case, the drill hole 16 is good;

b) The distribution of the energy field density falls below the threshold value before the defined last laser pulse. In this case, the wall of the workpiece 15 situated opposite the drill hole 16 may have been damaged. The damage may consist, for example, of another unintended drill hole made in this wall or of a thin point; and c) Also during the last defined laser pulse, the distribution of the energy field density does not fall below the threshold value. In this case, the drill hole 16 was at least not completed.

Here also, a simple and efficient possibility is implemented for monitoring the quality of a machined workpiece 15.

If, in addition to or instead of the distributions of the energy field densities, the pertaining machining site is also recorded and documented, it can then also be quantitatively determined where a corresponding aftertreatment of the workpiece 15 is necessary and perhaps possible. By means of this more extensive measure, the faulty site on the workpiece 15 can therefore be determined, whereby a method is provided for determining the location of possible subsequent machining. This reduces the costs of the aftertreatment because now a search for the faulty point does not have to take place over the whole workpiece 15.

In an advantageous further development of the above-mentioned method according to the invention, the respective distribution of the energy field density, if possible, is analyzed without any time delay and is used for controlling the machining. In the case of the above-mentioned machining example, this expediently takes place in that the drilling by means of the laser beam takes place until, at the site-resolving sensor 14 of the detector 8, the intensity of an individual pulse falls below the threshold value. When this occurs, a timing operation until the next drill hole takes place. In a preferred manner, until the next drill hole 16 is reached, the laser beam can be covered or the workpiece can be conveyed further and can be positioned correspondingly.

The method described by means of Example 2 is particularly advantageous in the case of workpieces which have a varying wall thickness course.

Preferred fields of application of the invention are the making of cooling and form drill holes in the case of turbine blades, preforations in the case of thin metal sheets, preferably for the boundary surface suctioning-off in the case of components surrounded by flows, such as wings and similar devices, injection openings of injection nozzles as well as microstructures in sliding and running surfaces. On the whole, the method is also advantageous in the case of components which have a preferably stabilizing fluting or reinforcements on the interior side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for measuring a pulsed laser beam's energy field density distribution, the method comprising the acts of:
   extracting a portion of said pulsed laser beam as a measuring beam, the measuring beam being constantly correlated with the laser beam;
   imaging the measuring beam at different points in time in a defined and locally mutually separated manner to provide a plurality of time-resolved partial beams; and
   measuring the energy field density distribution of each of said time-resolved partial beams of the measuring beam, which were imaged in the locally defined manner.

2. The method according to claim 1, wherein the laser beam is a pulsed laser beam.

3. The method according to claim 1, wherein at least one of pulse groups and individual pulses of the measuring beam are locally mutually separated at different points in time, and further wherein the energy field density distribution of the time-resolved pulses or pulse groups of the measuring beam, imaged in a locally defined manner, is measured.

4. The method according to claim 1, further comprising the acts of:
   reflecting the laser beam off an object; and
   extracting the measuring beam from the reflected laser beam.

5. The method according to claim 1, wherein the measuring act further comprises the act of separately measuring from one another with respect to time the energy field density distribution of individual pulses or pulse groups of the measuring beam.

6. The method according to claim 1, further comprising the acts of:
   guiding pulses of the measuring beam to a deviating device and deflecting said pulses by the deviating device in a locally defined manner; and
   adjusting a deflection of the deviating device per pulse or pulse group.

7. The method according to claim 1, further comprising the act of mutually independently deflecting the measuring beam via a deviating device into two different mutually transversely situated spatial directions.

8. The method according to claim 1, wherein the measuring beam is guided transversely to an original propagation direction of the laser beam in a direction of a deviating device.

9. The method according to claim 1, wherein radiation emanating from a machined workpiece as a result of the laser beam is selected as the measuring beam.

10. The method according to claim 9, wherein the radiation is heat radiation.

11. The method according to claim 1, wherein a reflection of the laser beam from a momentary machining site of a workpiece is selected as the measuring beam.

12. The method according to claim 1, wherein each pulse of the measuring beam is deflected to a single point in space.

13. The method according to claim 1, wherein an individual pulse of the measuring beam is divided into several individual subpulses.

14. The method according to claim 1, wherein the measuring beam is coupled out in an area of a machining focus of the laser beam.

15. The method according to claim 1, further comprising the acts of:
   coupling-out the measuring beam from a collimated crude beam of the laser beam;
   processing the coupled-out collimated crude beam in accordance with a future machining focus; and
   supplying the processed collimated crude beam to a deviating device as the measuring beam.

16. The method according to claim 1, wherein the measuring beam is coupled-out of the laser beam during a machining process.

17. A system for measuring an energy field density distribution of a pulsed laser beam, comprising:
   a laser source generating said pulsed laser beam;
   a detector;
   an extraction device which extracts a portion of said pulsed laser beam to provide a measuring beam which is constantly correlated with the pulsed laser beam, said extraction device being arranged within a beam path of the laser beam;
   a deviating device arranged in the beam path of the measuring beam, said deviating device including at least one manipulator which, as a function of time, deflects the measuring beam into defined spatial directions and divides the measuring beam into a plurality of partial beams; and
   wherein the detector is arranged to receive the plurality of partial beams of the measuring beam deflected by the deviating device to at least partially detect the energy field density distribution of the pulsed laser beam.

18. The system according to claim 17, wherein the deviating device is a mirror, and further comprising a rotary step motor coupled to control movements of said mirror.

19. The system according to claim 17, wherein the deviating device is a mirror movable in at least in one dimension.

20. The system according to claim 17, wherein the deviating device comprises an optical deflector movable at least in one dimension, said optical deflector operating in a non-mechanical manner.

21. The system according to claim 17, wherein said deviating device comprises at least one of a mirror, a beam splitter and a reflector.

22. The system according to claim 17, further comprising one of an optical switch and modulator arranged in the beam path of the laser beam.

23. The system according to claim 22, wherein said one of the optical switch and modulator is an apertured diaphragm disk rotating at a defined rotational speed.

24. The system according to claim 17, further comprising one of an electro-optical switch and an electro-optical modulator arranged in the beam path of the laser.

25. The system according to claim 17, wherein said detector is a site-resolving sensor element.

26. The system according to claim 17, wherein said detector is a CCD camera.

27. The system according to claim 17, wherein said detector includes a surface having site-resolving sensors.

28. The system according to claim 27, wherein said site-resolving sensors are photodiodes.

29. The system according to claim 17, wherein said detector is a CMOS detector array.

30. The system according to claim 17, further comprising at least one of focusing lenses, dispersing lenses, gray disks, mirrors and holographic-optical elements arranged in the beam path of the measuring beam.

* * * * *